US011843106B2

(12) United States Patent
Ceder et al.

(10) Patent No.: US 11,843,106 B2
(45) Date of Patent: Dec. 12, 2023

(54) SOLID-STATE LITHIUM-ION CONDUCTOR AND METHODS OF MANUFACTURE THEREOF

(71) Applicants: Samsung Electronics Co., Ltd., Suwon-Si (KR); The Regents of the University of California, Oakland, CA (US)

(72) Inventors: Gerbrand Ceder, Orinda, CA (US); Bin Ouyang, Richmond, CA (US); YingZhi Sun, El Cerrito, CA (US); Yihan Xiao, Berkeley, CA (US); Yan Eric Wang, Brookline, MA (US); Lincoln James Miara, Lincoln, MA (US)

(73) Assignees: SAMSUNG ELECTRONICS CO., LTD., Gyeonggi-Do (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 129 days.

(21) Appl. No.: 17/494,391

(22) Filed: Oct. 5, 2021

(65) Prior Publication Data
US 2022/0263061 A1 Aug. 18, 2022

Related U.S. Application Data

(60) Provisional application No. 63/150,691, filed on Feb. 18, 2021.

(51) Int. Cl.
*H01M 10/0525* (2010.01)
*H01M 4/04* (2006.01)
(Continued)

(52) U.S. Cl.
CPC ......... *H01M 4/131* (2013.01); *H01M 4/0442* (2013.01); *H01M 4/1391* (2013.01);
(Continued)

(58) Field of Classification Search
CPC ....... H01M 4/1391; H01M 2300/0071; H01M 2004/028; H01M 2004/027; H01M 4/131; H01M 4/0442; H01M 10/0525
See application file for complete search history.

(56) References Cited

U.S. PATENT DOCUMENTS 11,588,177 B2 * 2/2023 Wang .................... H01M 4/667

FOREIGN PATENT DOCUMENTS

CN 111370755 A 7/2020

OTHER PUBLICATIONS

Kelemen, G. et al., "Ionic conductivity of synthetic analcime, sodalite and offretite", Journal of materials science 24.1; 1989; pp. 333-338.

(Continued)

*Primary Examiner* — Cynthia H Kelly
*Assistant Examiner* — Tarik J Phillip
(74) *Attorney, Agent, or Firm* — CANTOR COLBURN LLP

(57) ABSTRACT

A solid-state ion conductor includes a compound of Formula (I):

$$Li_{4+(b-a)y+c\delta+(a-\gamma)x}M^1_{3+x+y}M^2_{3-y}M''_xO_{12}X^1_cX^2_{1-c}  \quad \text{Formula (I)}$$

wherein, $M^1$ is a cationic element having an oxidation state of +2 or +3; $M^2$ is a cationic element having an oxidation state of +4 or +5; $M''$ is a cationic element having an oxidation state of $\gamma$, wherein $\gamma$ is less than b; $X^1$ is a cluster anion having an oxidation state of $(-1-\delta)$, wherein $\delta$ is 0 or 1; $X^2$ is a halogen; $0<c\leq1$; $0\leq x\leq1$; and $0\leq y\leq2$.

19 Claims, 5 Drawing Sheets

(51) Int. Cl.
   *H01M 4/131*  (2010.01)
   *H01M 4/1391* (2010.01)
   *H01M 4/02*   (2006.01)

(52) U.S. Cl.
   CPC .. *H01M 10/0525* (2013.01); *H01M 2004/027* (2013.01); *H01M 2004/028* (2013.01); *H01M 2300/0071* (2013.01)

(56) References Cited

OTHER PUBLICATIONS

European Search Report for European Application No. 22 157 511.1, dated Jul. 20, 2022, 8 pages.

Liu, C., et al., "High Ion Conductivity in Garnet-type F-doped Li7La3Zr2O12," Journal of Inorganic Materials, vol. 30, No. 9, Sep. 2015, pp. 995-1001.

Yeandel, S., et al., "Structure and Lithium-Ion Dynamics in Fluoride-Doped Cubic Li7La3Zr2O12 (LLZO) Garnet for Li Solid-State Battery Applications," The Journal of Physical Chemistry C, 2018, 122, pp. 27811-27819.

Zhang, Z., et al., "Lithium halide coating as an effective intergrain engineer for garnet-type solid electrolytes avoiding high temperature sintering," Electrochimica Acta, 289, 2018, pp. 254-263.

Zhao, W., "Solid-State Electrolytes for Lithium-Ion Batteries: Fundamentals, Challenges and Perspectives," Electrochemical Energy Reviews, 2019, 2, pp. 574-605.

\* cited by examiner

FIG. 4   $Li_5Al_4Si_2O_{12}Br$ : $\sigma_{rt}$ = 7.116 mS/cm, $E_a$ = 0.211 eV

FIG. 5
Li$_5$Al$_4$Si$_2$O$_{12}$Cl : $\sigma_{rt}$ = 0.017 mS/cm, $E_a$ = 0.448 eV

FIG. 6
Li$_5$Al$_4$Si$_2$O$_{12}$I : $\sigma_{rt}$ = 4.067 mS/cm, $E_a$ = 0.232 eV

FIG. 7
Li$_5$Al$_4$Si$_2$O$_{12}$BH$_4$ : $\sigma_{rt}$ = 5.664 mS/cm, $E_a$ = 0.220 eV

FIG. 8
Li$_5$Al$_4$Si$_2$O$_{12}$SH : $\sigma_{rt}$ = 27.1 mS/cm, $E_a$ = 0.151 eV

FIG. 9

$Li_5Al_4Si_2O_{12}NH_2$ : $\sigma_{rt}$ = 0.218 mS/cm, $E_a$ = 0.334 eV

FIG. 10

$Li_5Al_4Si_2O_{12}AlH_4$ : $\sigma_{rt}$ = 1.70e-2 mS/cm, $E_a$ = 0.457 eV

SOLID-STATE LITHIUM-ION CONDUCTOR AND METHODS OF MANUFACTURE THEREOF

CROSS-REFERENCE TO RELATED APPLICATION

This application claims priority to U.S. Provisional Patent Application No. 63/150,691, filed on Feb. 18, 2021, in the United States Patent and Trademark Office, and all the benefits accruing therefrom under 35 U.S.C. § 119, the content of which is incorporated herein in its entirety by reference.

BACKGROUND (1) Field

Disclosed is a solid-state lithium-ion conductor and methods of manufacturing the solid-state lithium-ion conductor. Also disclosed is a positive electrode comprising the solid-state lithium-ion conductor, a negative electrode comprising the solid-state lithium-ion conductor, and an electrochemical cell comprising the solid-state lithium-ion conductor.

(2) Description of the Related Art

Solid-state lithium batteries can provide improved specific energy and energy density and can avoid safety concerns associated with flammable organic solvents used in liquid electrolytes. Oxide and sulfide solid-state electrolytes have been used. Available sulfides can provide greater lithium conductivity than oxides, however they also present safety concerns, for example reaction with air or water to evolve hydrogen sulfide. Oxides can provide reduced toxicity relative to sulfides, and stability in air, but application of available oxides is limited because of their low conductivity or incompatibility with high-voltage cathode materials or lithium metal.

Thus, there remains a need for a solid-state electrolyte which provides improved ionic conductivity and avoids the toxicity and safety concerns associated with sulfides.

SUMMARY

Disclosed is a solid-state ion conductor comprising a compound of Formula (I):

$$Li_{4+(b-a)y+c\delta+(a-\gamma)x}M^1{}_{3+x+y}M^2{}_{3-y}M'''{}_xO_{12}X^1{}_cX^2{}_{1-c} \quad \text{Formula (I)}$$

wherein, in Formula (I), $M^1$ is a cationic element having an oxidation state of a, wherein a is +2 or +3; $M^2$ is a cationic element having an oxidation state of b, wherein b is +4 or +5; provided that when $M^1$ is a cationic element having an oxidation state a of +2, $M^2$ is a cationic element having an oxidation state of +5, and when $M^1$ is a cationic element having an oxidation state a of +3, $M^2$ is a cationic element having an oxidation state of +4; M" is a cationic element having an oxidation state of γ, wherein γ is less than b; $X^1$ is a cluster anion having an oxidation state of (−1-δ), wherein δ is 0 or 1; $X^2$ is a halogen; $0<c\leq1$; $0\leq x\leq1$; and $0\leq y\leq2$, provided that when $M^1$ is a cationic element having an oxidation state a of +2 and $M^2$ is a cationic element having an oxidation state of +5, $0\leq y\leq1$.

Also disclosed is a positive electrode including: a positive active material layer including a lithium transition metal oxide, a lithium transition metal phosphate, or a combination thereof; and the solid-state ion conductor on the positive active material layer.

Also disclosed is a negative electrode comprising: a negative active material layer comprising lithium metal, a lithium metal alloy, or a combination thereof; and the solid-state ion conductor on the negative active material layer.

Also disclosed is a negative electrode for a lithium secondary battery, the electrode comprising: a current collector; and the solid-state ion conductor on the current collector.

Also disclosed is an electrochemical cell including: a positive electrode; a negative electrode; and an electrolyte layer between the positive electrode and the negative electrode, wherein at least one of the positive electrode, the negative electrode, or the electrolyte layer includes the solid-state ion conductor.

BRIEF DESCRIPTION OF THE DRAWINGS

The following figures are exemplary aspects wherein like elements are numbered alike, in which.

DETAILED DESCRIPTION

Currently available lithium-ion batteries have numerous safety issues due to the leakage and flammability of liquid organic electrolytes, which restrict their application in electric vehicles and grid-based energy storage infrastructure. In this case, solid-state batteries (SSBs) have been proposed as the next-generation batteries to address these limitations. Despite fast development in this arena, most solid-state lithium-ion conductors (SSLICs) are still far from practical. Moreover, many state-of-the-art oxide SSLICs, such as $Li_7La_3Zr_2O_{12}$, contain rare-earth elements or noble metals, which can increase the cost of the solid electrolyte. Therefore, it is desirable to discover new oxide SSLICs with high room-temperature ionic conductivity and lower cost elements.

The present inventors have discovered a solid-state ionic conductor that has high ionic conductivity and is useful as a solid electrolyte in a solid-state battery. The disclosed solid-state ionic conductor has a sodalite-type structure.

Accordingly, disclosed is a solid-state ion conductor comprising a compound of Formula (I):

$$Li_{4+(b-a)y+c\delta+(a-\gamma)x}M^1_{3+x+y}M^2_{3-y}M''_xO_{12}X^1_cX^2_{1-c} \quad \text{Formula (I)}$$

wherein, in Formula (I), $M^1$ is a cationic element having an oxidation state of a, wherein a is +2 or +3; $M^2$ is a cationic element having an oxidation state of b, wherein b is +4 or +5; provided that when $M^1$ is a cationic element having an oxidation state a of +2, $M^2$ is a cationic element having an oxidation state of +5, and when $M^1$ is a cationic element having an oxidation state a of +3, $M^2$ is a cationic element having an oxidation state of +4; $M''$ is a cationic element having an oxidation state of γ, wherein γ is less than b; $X^1$ is a cluster anion having an oxidation state of (−1-δ), wherein δ is 0 or 1; $X^2$ is a halogen; 0<c≤1; 0≤x≤1; and 0≤y≤2, provided that when $M^1$ is a cationic element having an oxidation state a of +2 and $M^2$ is a cationic element having an oxidation state of +5, 0≤y≤1.

In Formula (I), $M^1$ can be a cationic element having an oxidation state a of +3. For example, $M^1$ may be Al, B, Ga, In, Sc, Y, Fe, Mn, Co, Ni, La, Ce, Pr, Nd, Sm, Eu, Gd, Dy, Ho, Er, Lu, or a combination thereof. In an aspect, $M^1$ is Al. In Formula (I), $M^1$ can be a cationic element having an oxidation state a of +2. For example, $M^1$ may be Mg, Ca, Sr, Ba, Co, Ni, Zn, Fe, or a combination thereof. In Formula (I), $M^2$ can be a cationic element having an oxidation state b of +4. For example, $M^2$ may be Si, Ti, Zr, Hf, Ge, Sn, or a combination thereof. In an aspect, $M^2$ is Si. In Formula (I), $M^2$ can be a cationic element having an oxidation state b of +5. For example, $M^2$ may be Nb, Ta, P, As, Sb, or a combination thereof.

As noted above, when $M^1$ is a cationic element having an oxidation state a of +2, $M^2$ is a cationic element having an oxidation state of +5, and when $M^1$ is a cationic element having an oxidation state a of +3, $M^2$ is a cationic element having an oxidation state of +4. For example, when $M^1$ is Al, B, Ga, In, Sc, Y, Fe, Mn, Co, Ni, La, Ce, Pr, Nd, Sm, Eu, Gd, Dy, Ho, Er, Lu, or a combination thereof, then $M^2$ is Si, Ti, Zr, Hf, Ge, Sn, or a combination thereof. Alternatively, when $M^1$ is Mg, Ca, Sr, Ba, Co, Ni, Zn, Fe, or a combination thereof, then $M^2$ is Nb, Ta, P, As, Sb, or a combination thereof. In an aspect, $M^1$ is Al and $M^2$ is Si.

In an aspect, $M^1$ can be a cationic element having an oxidation state a of +3 and $M^2$ can be a cationic element having an oxidation state b of +4, and the solid-state ion conductor is of Formula (IA)

$$Li_{4+y+c\delta+(3-\gamma)x}M^{+3}_{3+x+y}M^{+4}_{3-y}M''_xO_{12}X^1_cX^2_{1-c} \quad \text{Formula (IA).}$$

In an aspect, $M^1$ can be a cationic element having an oxidation state a of +2 and $M^2$ can be a cationic element having an oxidation state b of +5, and the solid-state ion conductor is of Formula (IB)

$$Li_{4+3y+c\delta+(2-\gamma)x}M^{+2}_{3+x+y}M^{+5}_{3-y}M''_xO_{12}X^1_cS^2_{1-c} \quad \text{Formula (IB).}$$

In an aspect in Formula (I), x=0. Accordingly, $M''$ is not present in the compound of Formula (I) when x=0. In an aspect in Formula (I), 0<x≤1. When present, $M''$ is a cationic element having an oxidation state of γ, wherein γ is less than b. For example, when b is +5, $M''$ can have an oxidation state γ of +1, +2, +3, or +4, and when b is +4, $M''$ can have an oxidation state γ of +1, +2, or +3. In an aspect, $M''$ may be Al, B, Ga, In, Sc, Y, Fe, Mn, Co, Ni, La, Ce, Pr, Nd, Sm, Eu, Gd, Dy, Ho, Er, Lu, Be, or a combination thereof. Be is specifically mentioned.

$X^1$ in Formula (I) is a cluster anion having an oxidation state of (−1-δ), wherein δ is 0 or 1. In an aspect, δ is 0 and $X^1$ has an oxidation state of −1. In an aspect, δ is 1 and $X^1$ has an oxidation state of −2. A cluster anion having an oxidation state of −1 may also be referred to as a pseudohalogen. In an aspect, $X^1$ may be a pseudohalogen comprising $BH_4^-$, $BF_4^-$, $AlH_4^-$, $OH^-$, $SH^-$, $NH_2^-$ or a combination thereof. In an aspect, $X^1$ may be a pseudohalogen comprising $BH_4$, $BF_4^-$, $AlH^-_4$, $SH^-$, $NH_2^-$ or a combination thereof. In an aspect, $X^1$ may be a pseudohalogen comprising $BH_4^-$, $BF_4^-$, $SH^-$, $NH_2^-$ or a combination thereof. In an aspect, $X^1$ may be a pseudohalogen comprising $BH_4^-$, $BF_4^-$, $SH^-$, or a combination thereof. In an aspect, $X^1$ may be a pseudohalogen comprising $SH^-$. In an aspect, $X^1$ may be a cluster anion having an oxidation state of −2, for example $S^{2-}$, $SO_4^{2-}$, or a combination thereof.

The content of the cluster anion may be 0<c≤1. In an aspect, c=1. In an aspect, 0.01≤c≤1, or 0.1≤c≤1, or 0.1≤c≤0.9, or 0.1≤c≤0.75, or 0.1≤c≤0.5, or 0.1≤c≤0.25.

When c<1, $X^2$ is present in an amount of 1−c. $X^2$ of Formula (I) is a halogen and therefore may be $F^-$, $Cl^-$, $Br^-$, $I^-$, or a combination thereof. $Cl^-$ and $Br^-$ are specifically mentioned. In an aspect, $X^2$ is $Cl^-$. In an aspect, no halogens are present in the compound of Formula (I).

In a specific aspect, x=0 and the compound is of the Formula $$Li_{4+(b-a)y+c\delta}M^1_{3+y}M^2_{3-y}O_{12}X^1_cX^2_{1-c}$$

wherein $M^1$, $M^2$, $X^1$, $X^2$, a, b, c and δ are as defined above. For example, $M^1$ may be a cationic element having an oxidation state of +3; $M^2$ may be a cationic element having an oxidation state of +4; y may be 1; $X^1$ may be $BH_4^-$, $BF_4^-$, $AlH_4^-$, $OH^-$, $SH^-$, $NH_2^-$, $S^{2-}$, $SO_4^{2-}$, or a combination thereof; and c may be 1. For example, $M^1$ may be Al, B, Ga, In, Sc, Y, Fe, Mn, Co, Ni, La, Ce, Pr, Nd, Sm, Eu, Gd, Dy, Ho, Er, Lu, or a combination thereof; $M^2$ may be Si, Ti, Zr, Hf, Ge, Sn, or a combination thereof; y may be 1; $X^1$ may be $BH_4^-$, $BF_4^-$, $AlH_4^-$, $OH^-$, $SH^-$, $NH_2^-$, $S^{2-}$, $SO_4^{2-}$, or a combination thereof; and c may be 1. For example, $M^1$ may be Al; $M^2$ may be Si; y may be 1; $X^1$ may be $BH_4^-$, $BF_4^-$, $AlH_4^-$, $OH^-$, $SH^-$, $NH_2^-$, $S^{2-}$, $SO_4^{2-}$, or a combination thereof; and c may be 1.

In an aspect, the solid-state ion conductor may comprise, but is not limited to, $Li_5Al_4Si_2O_{12}BH_4$, $Li_5Al_4O_{12}SH$, $Li_5Al_4Si_2O_{12}NH_2$, $Li_5Al_4Si_2O_{12}AlH_4$, $Li_5Al_4Si_2O_{12}BF_4$, $Li_6Al_3Si_2BeO_{12}(BH_4)$, $Li_5Al_4Si_2(BH_4)_{0.5}Cl_{0.5}$, $Li_5Al_4Si_2(NH_2)_{0.5}Cl_{0.5}$, $Li_{4.5}Al_3Si_3O_{12}(Cl)_{0.5}(SO_4)_{0.5}$.

The solid-state ion conductor may have an ionic conductivity of equal to or greater than $1 \times 10^{-4}$ millisiemens per centimeter (mS/cm), at 300 Kelvin (K). For example, the solid-state ion conductor may have an ionic conductivity of $1 \times 10^{-4}$ mS/cm to $1 \times 10^2$ mS/cm, $1 \times 10^{-4}$ mS/cm to 40 mS/cm, $1 \times 10^{-4}$ mS/cm to 30 mS/cm, $1 \times 10^{-4}$ mS/cm to 25 mS/cm, $1 \times 10^{-4}$ mS/cm to 10 mS/cm, $1 \times 10^{-4}$ mS/cm to 8 mS/cm, $1 \times 10^{-4}$ mS/cm to 1 mS/cm or $1 \times 10^{-2}$ mS/cm to 1 mS/cm, at 300 K. Ionic conductivity may be determined by a complex impedance method at 300 K, further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety.

In a specific aspect, $M^1$ is Al, $M^2$ is Si, x=0, c=1 and $X^1$ is $BH_4$, and the solid-state ion conductor is of the formula $Li_5Al_4Si_2O_{12}BH_4$. When the solid-state ion conductor is $Li_5Al_4Si_2O_{12}BH_4$, the ionic conductivity can be $1\times10^{-4}$ mS/cm to $1\times10^2$ mS/cm, or 1 mS/cm to $1\times10^2$ mS/cm, or 1 mS/cm to 10 mS/cm.

In a specific aspect, $M^1$ is Al, $M^2$ is Si, x=0, c=1 and $X^1$ is SH, and the solid-state ion conductor is of the formula $Li_5Al_4Si_2O_{12}SH$. When the solid-state ion conductor is $Li_5Al_4Si_2O_{12}SH$, the ionic conductivity can be $1\times10^{-4}$ mS/cm to $1\times10^2$ mS/cm, or 1 mS/cm to $1\times10^2$ mS/cm, or 1 mS/cm to 30 mS/cm.

In a specific aspect, $M^1$ is Al, $M^2$ is Si, x=0, c=1 and $X^1$ is $NH_2$, and the solid-state ion conductor is of the formula $Li_5Al_4Si_2O_{12}NH_2$. When the solid-state ion conductor is $Li_5Al_4Si_2O_{12}NH_2$, the ionic conductivity can be $1\times10^{-4}$ mS/cm to $1\times10^2$ mS/cm, or $1\times10^{-2}$ mS/cm to 1 mS/cm.

In a specific aspect, $M^1$ is Al, $M^2$ is Si, x=0, c=1 and $X^1$ is $AlH_4$, and the solid-state ion conductor is of the formula $Li_5Al_4Si_2O_{12}AlH_4$. When the solid-state ion conductor is $Li_5Al_4Si_2O_{12}AlH_4$, the ionic conductivity can be $1\times10^{-4}$ mS/cm to $1\times10^2$ mS/cm.

In a specific aspect, $M^1$ is Al, $M^2$ is Si, x=0, c=1 and $X^1$ is $BF_4$, and the solid-state ion conductor is of the formula $Li_5Al_4Si_2O_{12}BF_4$. When the solid-state ion conductor is $Li_5Al_4Si_2O_{12}BF_4$, the ionic conductivity can be $1\times10^{-4}$ mS/cm to $1\times10^2$ mS/cm, or $1\times10^{-2}$ mS/cm to 1 mS/cm.

A method for the manufacture of the solid-state ion conductor is also disclosed. The solid-state ion conductor may be prepared using a wet synthesis method. For example, the solid-state ion conductor may be prepared by contacting precursor compounds, e.g., a lithium compound, a $M^1$ precursor, a $M^2$ precursor, an $X^1$ precursor, and optionally, a M'' precursor and optionally a $X^2$ precursor, in stoichiometric amounts to provide a mixture having a suitable stoichiometry of the elements of the product solid-state ion conductor, and then treating the mixture to provide the solid-state ion conductor of Formula (I). For example, the lithium precursor may be $LiNO_3$ or LiOH, the $M^1$ precursor may be $M^1O$, $M^1{}_2O_3$, $M^1(OH)_2$, $M^1(OH)_3$, $M^1(NO_3)_2$, $M^1(NO_3)_3$, the $M^2$ precursor may be $M^2O_2$, $M^2{}_2O_5$, $Li_2M^2O_3$, $Li_3M^2O_4$, $M^2(NO_3)_4$, $M^2(NO_3)_5$, the $X^1$ precursor may be $LiX^1$, the M'' precursor (when present) may be M''O, M''$_2O_3$, M''$(OH)_2$, M''$(OH)_3$, M''$(NO_3)_2$, M''$(NO_3)_3$, and the $X^2$ precursor (when present) may be $LiX^2$ or $Li_2X^2$.

The treating may comprise any suitable method, e.g., hydrothermal synthesis, solvothermal synthesis or microwave synthesis. The hydrothermal synthesis and solvothermal synthesis may use any suitable solvent, such as water, ethylene glycol, 1-butanol, 1-hexanol, 1-octanol, 1-decanol or a combination thereof, at a suitable temperature, such as 100° C. to 200° C., or 200° C. to 250° C., or 250° C. to 300° C., for a time effective to provide the solid-state ion conductor, e.g., 0.5 to 20 hours, 2 to 48 hours, or 3 to 180 hours, or 0.5 to 2 hours, or 0.7 to 1 hour.

The microwave synthesis may use any suitable solvent, such as water, ethylene glycol, 1-butanol, 1-hexanol, 1-octanol, 1-decanol or a combination thereof, at a suitable temperature, e.g., 100° C. to 200° C., or 200° C. to 250° C., or 250° C. to 300° C. Use of a microwave with a frequency of 2.45 GHz or 915 MHz, for 10 to 60 minutes, or 1 to 30 hours, is mentioned.

The disclosed method provides the solid-state ion conductor having desirable ionic conductivity and stability, e.g., stability of 1.5 volts (V versus $Li/Li^+$) to 5 V, e.g., 1.75 V to 4.8 V, 2 V to 4.6V, or 2.5 V to 4.4 V, versus $Li/Li^+$. In an aspect, the solid-state ion conductor is at least kinetically stable when contacted with a lithium transition metal oxide positive electrode active material, such as lithium nickel cobalt manganese oxide or lithium nickel cobalt aluminum oxide, a lithium transition metal phosphate positive electrode active material, such as lithium iron phosphate, or is at least kinetically stable when contacted with lithium metal, e.g., the solid-state ion conductor does not form an alloy or compound when contacted with lithium metal.

Figure 1:
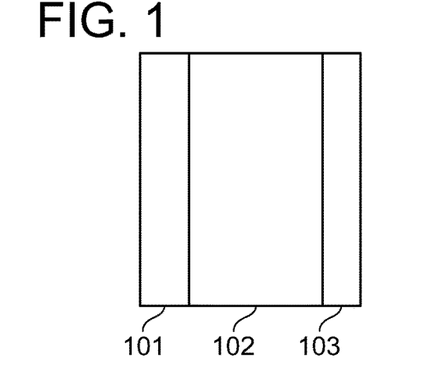
FIG. 1 shows an aspect of a protected positive electrode.

The solid-state ion conductor can be disposed on a positive active material layer to provide a protected positive electrode, shown schematically in FIG. 1, which includes a current collector 101, a positive active material layer 102 and protection layer 103 comprising the solid-state ion conductor on the positive active material layer. While not wanting to be bound by theory, it is understood that use of the protection layer comprising the solid-state ion conductor can avoid degradation of the positive active material, resulting in improved performance. The protection layer may be disposed on the positive active material layer by sputtering, for example, or by casting or coating the positive active material layer with a coating composition comprising the solid-state ion conductor and drying to remove a solvent of the coating composition, for example.

Figure 2:
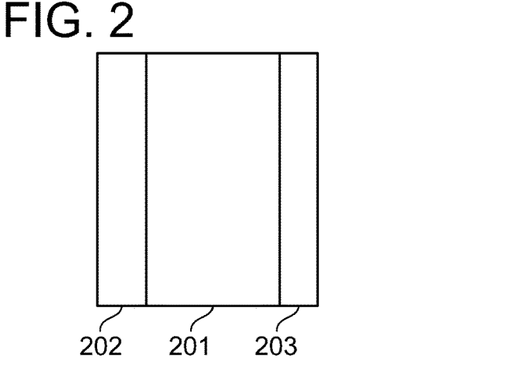
FIG. 2 shows an aspect of a protected negative electrode.

The solid-state ion conductor can be disposed on a negative active material layer to provide a protected negative electrode, shown schematically in FIG. 2, which includes a negative active material layer 201 disposed on a current collector 202, and a protection layer 203 comprising the solid-state ion conductor on the negative active material layer. While not wanting to be bound by theory, it is understood that use of the protection layer comprising the solid-state ion conductor can avoid degradation of the negative active material, resulting in improved performance. The protection layer may be disposed on the negative active material layer by sputtering, for example, or by casting or coating the negative active material layer with a coating composition comprising the solid-state ion conductor and drying to remove a solvent of the coating composition, for example.

In an aspect, the solid-state ion conductor can alternatively be disposed on a current collector to provide a negative electrode. The protection layer may be disposed on the negative active material layer by sputtering, for example, or by casting or coating the current collector with a coating composition comprising the solid-state ion conductor and drying to remove a solvent of the coating composition, for example.

Figure 3:
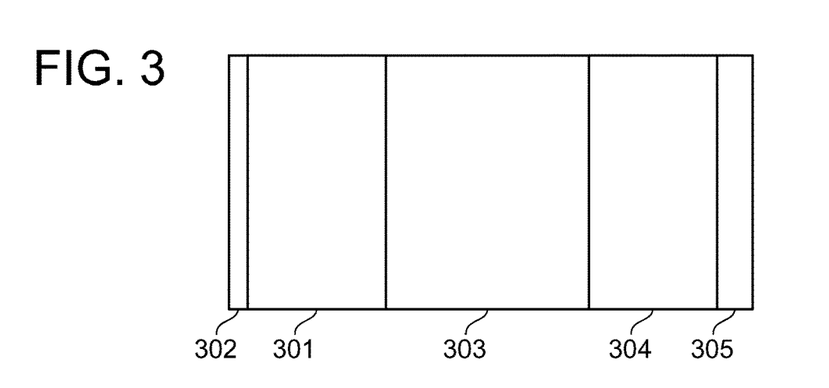
FIG. 3 shows an aspect of a lithium battery.

Also disclosed is an electrochemical cell (e.g., a lithium battery) comprising a positive electrode, a negative electrode, and an electrolyte layer between the positive electrode and the negative electrode, wherein at least one of the positive electrode, the negative electrode or the electrolyte layer comprises the solid-state ion conductor of the present disclosure. For example, the solid-state ion conductor can be disposed between the positive electrode and the negative electrode of a lithium battery and can serve as a solid electrolyte in the lithium battery, shown schematically in FIG. 3. Included in the lithium battery shown in FIG. 3 is a positive electrode comprising a positive active material layer 301 on a positive current collector 302, an electrolyte layer 303, and a negative electrode comprising a negative active material layer 304 on negative current collector 305. It is understood that the positive electrode could alternatively be referred to as a cathode, and the negative electrode as an anode. The electrolyte layer may comprise the solid-state ion conductor. In an aspect, the electrolyte layer is suitably electrically insulating to serve as a separator to electrically isolate the positive electrode from the negative electrode. For the positive current collector aluminum or stainless steel may be used, and for the negative current collector copper, stainless steel, or titanium may be used.

The electrolyte layer may alternatively or additionally comprise a solid electrolyte other than or in addition to the solid-state ion conductor. The solid electrolyte may comprise, for example, an oxide solid electrolyte or a sulfide solid electrolyte.

Examples of the oxide solid electrolyte may include $Li_{1+x+y}Al_xTi_{2-x}Si_yP_{3-y}O_{12}$ (where $0<x<2$ and $0\leq y<3$), $BaTiO_3$, $Pb(Zr_aTi_{1-a})O_3$ (PZT) where $0\leq a\leq 1$, $Pb_{1-x}La_xZr_{1-y}Ti_yO_3$ (PLZT) where $0\leq x<1$ and $0\leq y<1$, $Pb(Mg_{1/3}Nb_{2/3})O_3$—$PbTiO_3$ (PMN-PT) $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0\leq x\leq 1$, $0\leq y\leq 1$, $0\leq a\leq 1$, and $0\leq b\leq 1$, $Li_xLa_yTiO_3$ where $0<x<2$ and $0<y<3$, $Li_2O$, LiOH, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ where M is Te, Nb, or Zr, and $0\leq x\leq 10$. Also mentioned is a lithium garnet such as $Li_7La_3Zr_2O_{12}$ (LLZO) or $Li_{3+x}La_3Zr_{2-a}Me_aO_{12}$ (e.g., Me-doped LLZO, where Me is Ga, W, Nb, Ta, or Al, and $0\leq x\leq 10$ and $0\leq a<2$). A combination comprising at least one of the foregoing may be used.

Examples of the sulfide solid electrolyte may include $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_m$ where m and n each are a positive number, Z represents any of Ge, Zn, and Ga, $Li_2S$—$GeS_2$, $Li_2S$—$SiS_2$—$Li_3PO_4$, $Li_2S$—$SiS_2$—$Li_pMeO_q$ (where p and q each are a positive number, Me represents at least one of P, Si, Ge, B, Al, Ga, or In), $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where $0\leq x\leq 2$). The sulfide solid electrolyte may include at least sulfur (S), phosphorus (P), and lithium (Li), as component elements among the sulfide solid electrolyte materials. For example, the sulfide solid electrolyte may be a material including $Li_2S$—$P_2S_5$. Here, when the material including $Li_2S$—$P_2S_5$ is used as a sulfide solid electrolyte material, a molar ratio of $Li_2S$ and $P_2S_5$ ($Li_2S:P_2S_5$) may be, for example, selected in a range of about 50:50 to about 90:10. The sulfide solid electrolyte may also comprise an argyrodite-type solid electrolyte, such as $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where $0<x<2$), e.g., $Li_6PS_5Cl$, $Li_6PS_5Br$, or $Li_6PS_5I$.

The electrolyte layer comprising the solid-state ion conductor may be non-porous or have a porosity of 0% (no pores) to 25%, based on a total volume of the electrolyte layer. The porosity may be, for example, 0% to 25%, 1% to 20%, 5% to 15%, or 7% to 12%, based on a total volume of the electrolyte layer. The porosity of electrolyte layer may be determined by scanning electron microscopy, the details of which can be determined by one of skill in the art without undue experimentation. Alternatively, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the details of which can be determined by one of skill in the art without undue experimentation.

In an aspect, the electrolyte layer is porous, and an ionic liquid, a polymer-ionic liquid, a liquid electrolyte comprising a lithium salt and an organic solvent, or a combination thereof is disposed in a pore of the electrolyte layer to provide a hybrid electrolyte.

The ionic liquid (e.g., molten salt) may comprise i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion, e.g., $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(C_3SO_2)_2N^-$, or a combination thereof. Examples of the ionic liquid include N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, 1-ethyl-3-methyl-imidazolium, bis(trifluoromethylsulfonyl)imide, or a combination thereof.

The polymer ionic liquid may be a polymerization product of ionic liquid monomers, or a polymeric compound. The polymer ionic liquid may include a repeating unit that includes i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion, e.g., $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

For the liquid electrolyte comprising a lithium salt and an organic solvent, the lithium salt may be a lithium salt of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO$, or a combination thereof. The organic solvent may comprise a carbonate such as propylene carbonate, ethylene carbonate, fluoroethylene carbonate, butylene carbonate, dimethyl carbonate, diethyl carbonate, methyl ethyl carbonate, or a combination thereof.

The electrolyte layer may further comprise a separator film. The separator film may be electrically insulating, and may comprise polyethylene, polypropylene, polyvinylidene fluoride, or a combination thereof. For example, the separator film may be a multilayer separator film, such as a two-layer separator of polyethylene/polypropylene, a three-layer separator of polyethylene/polypropylene/polyethylene, or a three-layer separator of polypropylene/polyethylene/polypropylene. The separator film may have a pore diameter of 0.01 µm to 10 µm, and a thickness of 5 µm to 20 µm. If present, the liquid electrolyte, ionic liquid, or polymer ionic-liquid electrolyte may be disposed in a pore of the separator film.

In an aspect, other electrolytes, including a liquid electrolyte or ionic-liquid (e.g., molten salt) electrolyte can be excluded from the disclosed electrolyte layer.

The electrolyte layer may have any suitable thickness. A thickness of the solid electrolyte layer may be 1 to 300 µm, 2 to 100 µm, or 30 to 60 µm.

The positive electrode comprises a positive active material layer comprising a lithium transition metal oxide, a lithium transition metal phosphate, or a combination thereof. For example, the positive active material can be a compound represented by any of $Li_aM^1_{1-b}M^2_bD_2$ wherein $0.90 \leq a \leq 1.8$ and $0 \leq b \leq 0.5$; $Li_aE_{1-b}M^2_bO_{2-c}D_c$ wherein $0.90 \leq a \leq 1.8$, $0 \leq b \leq 0.8$, and $0 \leq c \leq 0.05$; $LiE_{2-b}M^2_bO_{4-c}D_c$ wherein $0 \leq b \leq 0.5$ and $0 \leq c \leq 0.05$; $Li_aNi_{1-b-c}Co_bM^2_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bM^2_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Co_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aN_{i-b-c}Mn_bM^2_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Mn_bM^2_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; or $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0 < x \leq 1$, $LiNi_{1-x-y}Co_xMn_yO_2$ where $0 \leq x \leq 0.5$ and $0 \leq y \leq 0.5$, $LiNi_{1-x-y}Co_xAl_yO_2$ where $0 \leq x \leq 0.5$ and $0 \leq y \leq 0.5$, $LiFePO_4$, $TiS_2$, $FeS_2$, $TiS_3$, or $FeS_3$. For example, the positive active material may comprise NMC 811 ($LiNi_{0.8}Mn_{0.1}Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), or NCA ($LiNi_{0.8}Co_{0.15}Al_{0.05}O_2$).

The positive active material layer may further include a binder. A binder can facilitate adherence between components of the positive active material layer, and adherence of the positive active material layer to the current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of 1 part by weight to 10 parts by weight, for example, in a range of 2 parts by weight to 7 parts by weight, based on a total weight of the positive active material. When the amount of the binder is in the range above, e.g., 1 part by weight to 10 parts by weight, the adherence of the electrode to the current collector may be suitably strong.

The positive active material layer may further include a conductive agent. Any suitable conductive agent may be used. The conductive agent may comprise a carbon, a metal, or an oxide. The carbon may comprise carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. The metal may comprise a metal element, e.g., nickel, and may by in the form of a fiber or powder, such as aluminum powder or a nickel powder. The conductive agent may comprise an oxide, such as a zinc oxide or a potassium titanate; or a conductive polymer, such as a polyethylene oxide or a polyphenylene derivative. A combination comprising at least one of the foregoing conductive agents may be used. An amount of the conducting agent may be from about 1 part by weight to about 10 parts by weight, for example, from about 2 parts by weight to about 5 parts by weight, based on 100 parts by weight of the total weight of the positive active material.

The positive active material layer may further comprise the solid-state ion conductor, or alternatively or additionally comprise a solid electrolyte other than or in addition to the solid-state ion conductor. The solid electrolyte may comprise, for example, the oxide solid electrolyte, the sulfide solid electrolyte, or a combination thereof.

The positive active material layer may be disposed on the surface of a substrate, e.g., an aluminum foil current collector, using any suitable means, for example, using tape casting, slurry casting (i.e., slurry coating), or screen printing. Additional details of tape casting, slurry coating, and screen printing, for example suitable binders and solvents, can be determined by one of skill in the art without undue experimentation. For example, N-methylpyrrolidone may be used as the solvent.

The positive active material layer may have any suitable thickness, e.g., a thickness of 1 to 300 μm, 2 μm to 100 μm, or 30 to 60 μm.

The negative electrode may comprise a negative active material layer on a current collector. The negative active material layer may comprise carbon, a non-transition metal oxide, lithium metal, a lithium metal alloy, or a combination thereof. The carbon may comprise natural graphite or artificial graphite, each of which may be crystalline or amorphous. Examples of the amorphous carbon include soft carbon, hard carbon, mesocarbon, mesophase pitch carbon, and calcined coke. The non-transition metal oxide may comprise $SnO_x$ where $0 < x \leq 2$, or $SiO_x$ where $0 < x \leq 2$. The lithium metal alloy for the negative electrode may include lithium, and a metal or metalloid alloyable with lithium. Examples of the metal or metalloid alloyable with lithium include Si, Sn, Al, Ge, Pb, Bi, Sb, a Si—Y' alloy (wherein Y' is at least one of an alkali metal, an alkaline earth metal, a Group 13 to Group 16 element, a transition metal, or a rare earth element, except for Si), or a Sn—Y' alloy (wherein Y' is at least one of an alkali metal, an alkaline earth metal, a Group 13 to Group 16 element, a transition metal, or a rare earth element, except for Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Ge, P, As, Sb, Bi, S, Se, Te, Po, or a combination thereof. The current collector for the negative electrode may be copper or titanium, for example.

The negative electrode active material layer may comprise a binder as is further disclosed above. The negative active material layer may be disposed on the surface of a substrate, e.g., a copper or titanium foil current collector using any suitable means, for example, using tape casting, slurry casting, or screen printing. Additional details of tape casting and screen printing, for example suitable binders and solvents, can be determined by one of skill in the art without undue experimentation. For example, N-methylpyrrolidone may be used as the solvent.

The negative active material layer may further comprise the solid-state ion conductor, or alternatively or additionally comprise a solid electrolyte other than or in addition to the solid-state ion conductor. The solid electrolyte may comprise, for example, the oxide solid electrolyte, the sulfide solid electrolyte, or a combination thereof.

The negative electrode may be an "anode-free" or "anodeless" type wherein lithium is not initially present in the negative electrode. In the "anode-free" type negative electrode, the negative electrode may initially comprise a current collector and a solid electrolyte, e.g., the solid-state ion conductor of Formula (I), or alternatively or in addition at least one of the oxide solid electrolyte or the sulfide solid electrolyte on the current collector. In an aspect, the solid-state ion conductor, the solid electrolyte, or a combination thereof is directly on the current collector. Charging the battery can deposit lithium to form the negative active material layer on the current collector, e.g., to deposit lithium metal or form a lithium metal alloy on the current collector. The solid-state ion conductor of Formula (I), or alternatively or in addition at least one of the oxide solid electrolyte or the sulfide solid electrolyte may be disposed on the current collector by sputtering or coating, for example.

The lithium battery can be manufactured by providing the positive electrode, providing the negative electrode, and disposing the solid-state ion conductor comprising the compound according to Formula (I) between the position electrode and the negative electrode. For example, a lithium battery can be manufactured by sputtering the solid-state ion conductor comprising the compound according to Formula (I) on the positive active material layer, disposing a negative electrode thereon, winding or folding the resulting structure, and then enclosing the wound or folded structure in a cylindrical or rectangular battery case or pouch to provide the lithium battery.

This disclosure is further illustrated by the following examples, which are non-limiting.

EXAMPLES

Ionic Conductivity Analysis

The ionic conductivities of various compounds according to Formula (I) were determined by ab-initio molecular dynamics (AIMD) calculations using the Vienna Ab Initio Simulation Package. Relevant parameters of the calculation include projector augmented wave potentials with a kinetic energy cutoff of 400 eV, the exchange and correlation functionals of Perdew-Burke-Ernzerhof generalized gradient (GGA-PBE), and 200 picoseconds simulation time with a time step of 2 femtoseconds. For comparison, the ionic conductivity was also determined for $Li_5Al_4Si_2Br$, $Li_5Al_4Si_2Cl$, and $Li_5Al_4Si_2O_{12}I$.

Figure 4:
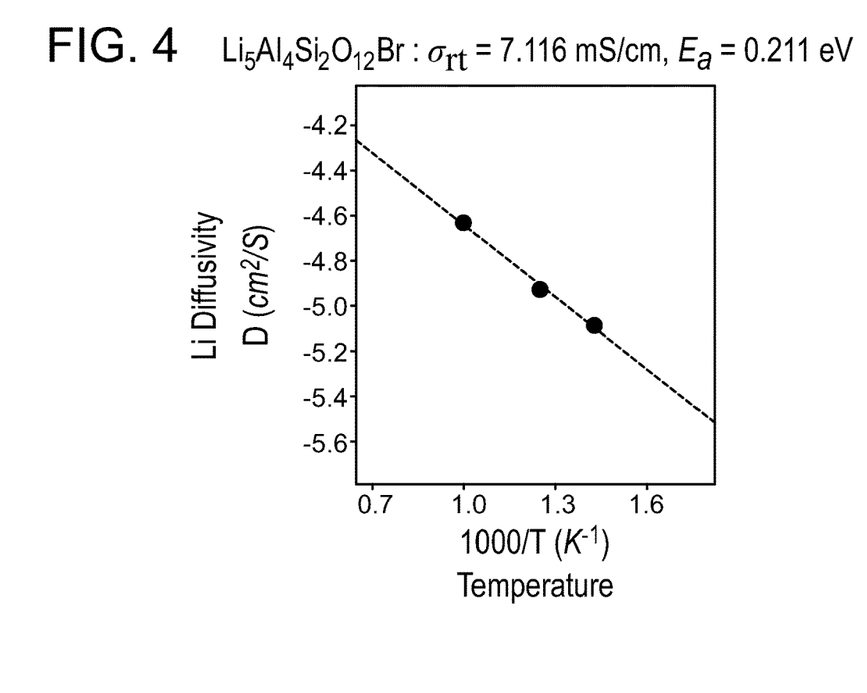
FIG. 4 is a graph of the lithium diffusivity (centimeters squared per second, $cm^2/s$) versus temperature ($K^{-1}$) showing the results of Arrhenius analysis of $Li_5Al_4Si_2O_{12}Br$.

Shown in FIG. 4 is an Arrhenius plot of the simulation results for $Li_5Al_4Si_2O_{12}Br$ as a comparative example. The activation energy was 0.211 electron volts (eV) and the ionic conductivity at 300 K was 7.116 mS/cm.

Figure 5:
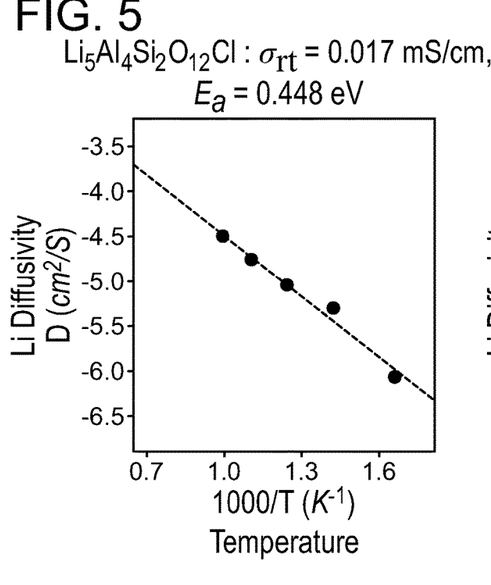
FIG. 5 is a graph of the lithium diffusivity ($cm^2/s$) versus temperature ($K^{-1}$) showing the results of Arrhenius analysis of $Li_5Al_4Si_2O_{12}Cl$.

Shown in FIG. 5 is an Arrhenius plot of the simulation results for $Li_5Al_4Si_2O_{12}Cl$ as a comparative example. The activation energy was 0.448 electron volts (eV) and the ionic conductivity at 300 K was 0.017 mS/cm.

Figure 6:
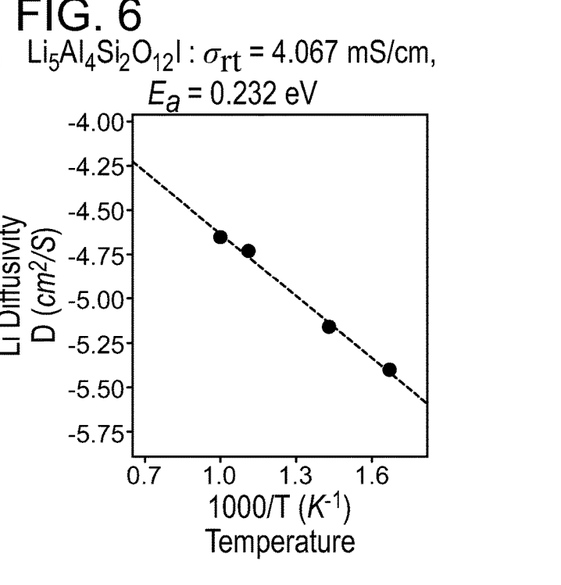
FIG. 6 is a graph of the lithium diffusivity ($cm^2/s$) versus temperature ($K^{-1}$) showing the results of Arrhenius analysis of $Li_5Al_4Si_2O_{12}I$.

Shown in FIG. 6 is an Arrhenius plot of the simulation results for $Li_5Al_4Si_2O_{12}I$ as a comparative example. The activation energy was 0.232 electron volts (eV) and the ionic conductivity at 300 K was 4.067 mS/cm.

Figure 7:
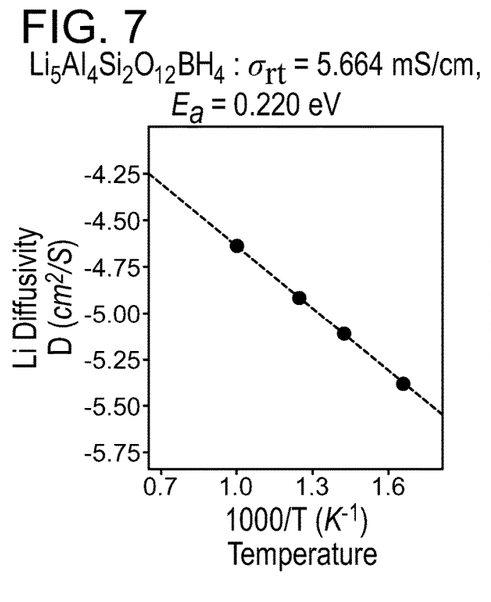
FIG. 7 is a graph of the lithium diffusivity ($cm^2/s$) versus temperature ($K^{-1}$) showing the results of Arrhenius analysis of $Li_5Al_4Si_2O_{12}BH_4$.

Shown in FIG. 7 is an Arrhenius plot of the simulation results for $Li_5Al_4Si_2O_{12}BH_4$. The activation energy was 0.220 electron volts (eV) and the ionic conductivity at 300 K was 5.664 mS/cm.

Figure 8:
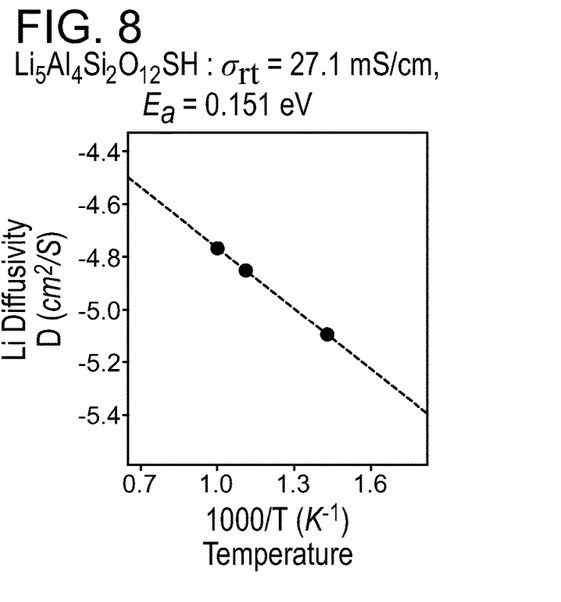
FIG. 8 is a graph of the lithium diffusivity ($cm^2/s$) versus temperature ($K^{-1}$) showing the results of Arrhenius analysis of $Li_5Al_4Si_2O_{12}SH$.

Shown in FIG. 8 is an Arrhenius plot of the simulation results for $Li_5Al_4Si_2O_{12}SH$. The activation energy was 0.151 electron volts (eV) and the ionic conductivity at 300 K was 27.1 mS/cm.

Figure 9:
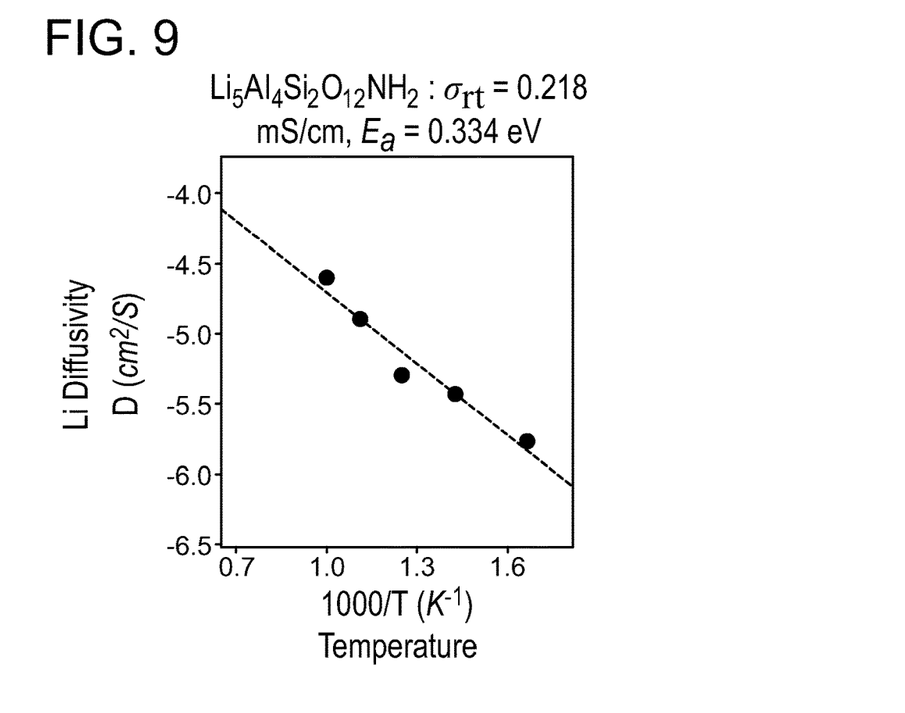
FIG. 9 is a graph of the lithium diffusivity ($cm^2/s$) versus temperature ($K^{-1}$) showing the results of Arrhenius analysis of $Li_5Al_4Si_2O_{12}NH_2$.

Shown in FIG. 9 is an Arrhenius plot of the simulation results for $Li_5Al_4Si_2O_{12}NH_2$. The activation energy was 0.334 electron volts (eV) and the ionic conductivity at 300 K was 0.218 mS/cm.

Figure 10:
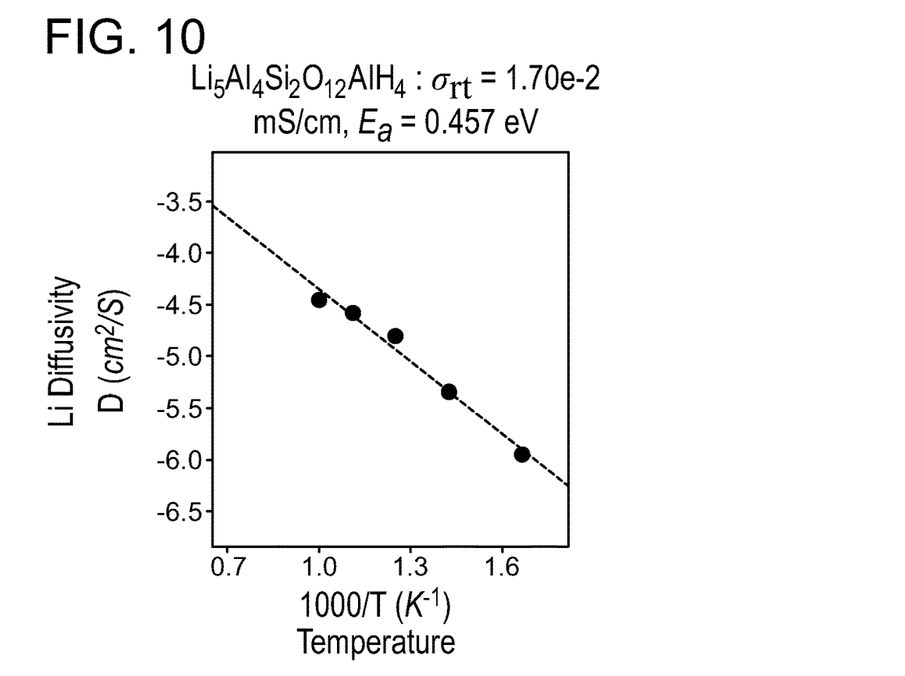
FIG. 10 is a graph of the lithium diffusivity ($cm^2/s$) versus temperature ($K^{-1}$) showing the results of Arrhenius analysis of $Li_5Al_4Si_2O_{12}AlH_4$.

Shown in FIG. 10 is an Arrhenius plot of the simulation results for $Li_5Al_4Si_2O_{12}AlH_4$. The activation energy was 0.457 electron volts (eV) and the ionic conductivity at 300 K was $1.70 \times 10^{-2}$ mS/cm.

Figure 11:
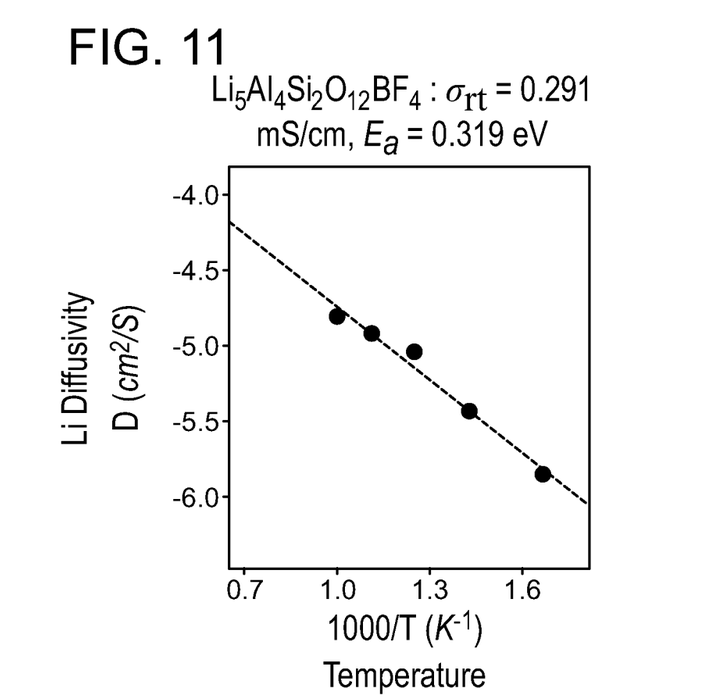
FIG. 11 is a graph of the lithium diffusivity ($cm^2/s$) versus temperature ($K^{-1}$) showing the results of Arrhenius analysis of $Li_5Al_4Si_2O_{12}BF_4$.

Shown in FIG. 11 is an Arrhenius plot of the simulation results for $Li_5Al_4Si_2O_{12}BF_4$. The activation energy was 0.319 electron volts (eV) and the ionic conductivity at 300 K was 0.291 mS/cm.

Figure 12:
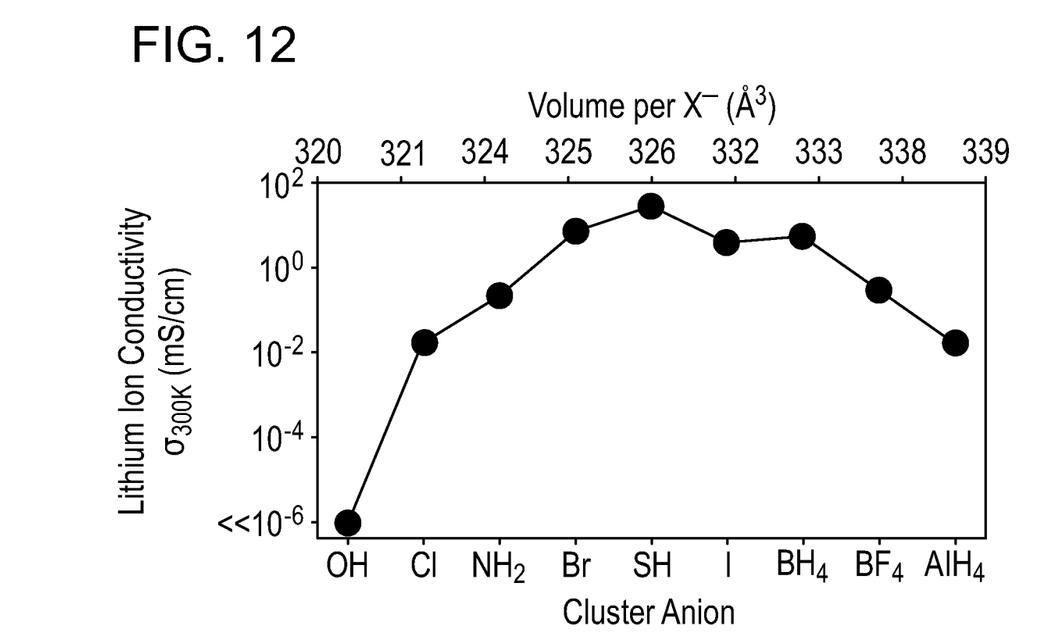
FIG. 12 is a graph of lithium-ion conductivity at 300K (millisiemens per centimeter, mS/cm) versus volume of the anion (cubic Angstroms, $Å^3$) for various sodalite-type materials.

The relationship between lithium-ion conductivity and the size of the anion (e.g., $X^1$) is shown in FIG. 12 and Table 1. From FIG. 12 and Table 1, it can be seen that the ionic conductivity increases with increasing anion ($X^1$) size to a point (e.g., to about 330 Å$^3$). The ionic conductivity then appears to decrease as the anion size continues to increase.

TABLE 1

| Composition | Conductivity (mS/cm) |
|---|---|
| $Li_4Al_3Si_3O_{12}Cl$ | <10$^{-6}$ |
| $Li_5Al_4Si_2O_{12}Cl$ | 0.017 |
| $Li_5Al_4Si_2O_{12}Br$ | 7.116 |
| $Li_5Al_4Si_2O_{12}I$ | 4.069 |
| $Li_5Al_4Si_2O_{12}BH_4$ | 5.664 |
| $Li_5Al_4Si_2O_{12}BF_4$ | 0.291 |
| $Li_5Al_4Si_2O_{12}AlH_4$ | 1.7 × 10$^{-2}$ |
| $Li_5Al_4Si_2O_{12}OH$ | <10$^{-8}$ |
| $Li_5Al_4Si_2O_{12}SH$ | 27.1 |
| $Li_5Al_4Si_2O_{12}NH_2$ | 0.218 |

These results illustrate that the compound of Formula (I) provides unexpectedly improved lithium-ion conductivity. In a particularly surprising result, it can be seen that a high room temperature ionic conductivity of over 25 mS/cm can be achieved by at least partially substituting a halide with a thiol.

The compounds described above may be prepared according to the following methods.

Example 1

$Li_5Al_4Si_2O_{12}BH_4$

Stoichiometric amounts of LiOH, $Al_2O_3$, $SiO_2$ and $LiBH_4$ will be combined to provide a mixture. The mixture will be dissolved in water and heat treated at 120° C. for 24 hours in a hydrothermal synthesis autoclave reactor to provide $Li_5Al_4Si_2O_{12}BH_4$. The product will be analyzed by X-ray powder diffraction (XRD) using CuKα radiation, and XRD analysis will show that $Li_5Al_4Si_2O_{12}BH_4$ is prepared.

Figure 13:
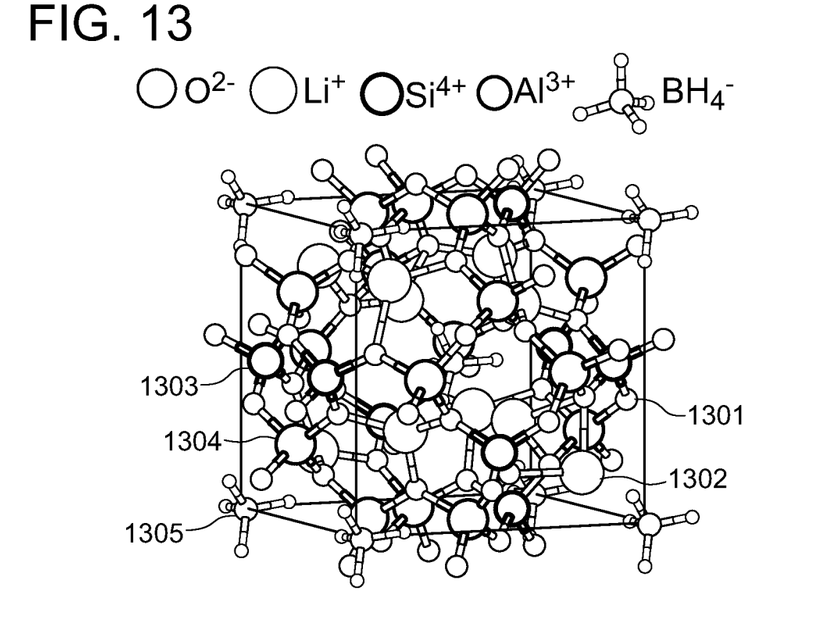
FIG. 13 shows an aspect of the crystal structure of a solid-state ion conductor of the formula $Li_5Al_4Si_2O_{12}BH_4$.

A simulated crystal structure for $Li_5Al_4Si_2O_{12}BH_4$ is shown in FIG. 13, where the arrangement of O$^{2-}$ (1301), Li$^+$ (1302), Si$^{4+}$ (1303), Al$^{3+}$ (1304), and $BH_4^{-5}$ (1305) can be seen.

Figure 14:
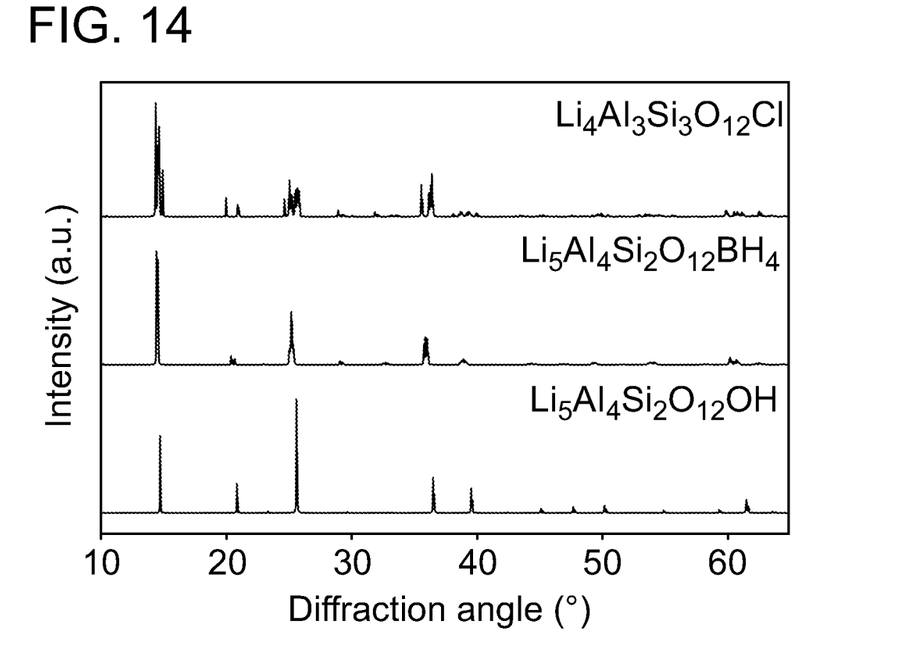
FIG. 14. is a graph of intensity (arbitrary units, a.u.) versus diffraction angle (degrees 2θ) showing a calculated X-ray powder diffraction (XRD) pattern for $Li_5Al_4Si_2O_{12}X$ (X=Cl, OH, $BH_4$)

A simulated XRD spectrum for $Li_5Al_4Si_2O_{12}BH_4$ is shown in FIG. 14. Also shown in FIG. 14 for reference is a simulated XRD spectrum of $Li_4Al_3Si_3O_{12}Cl$.

Example 2

$Li_5Al_4Si_2O_{12}OH$

Stoichiometric amounts of of LiOH, $Al_2O_3$ and $SiO_2$ will be combined to provide a mixture. The mixture will be dissolved in water and heat treated at 120° C. for 30 minutes with the assistance of 2.45 GHz microwave in a quartz tube reactor to provide $Li_5Al_4Si_2O_{12}OH$. The product will be analyzed by X-ray powder diffraction (XRD) using CuKα radiation, XRD analysis will show that $Li_5Al_4Si_2O_{12}OH$ is prepared.

A simulated XRD spectrum for $Li_5Al_4Si_2O_{12}OH$ is shown in FIG. 14.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross section illustrations that are schematic illustrations of idealized aspects. As such, variations from the shapes of the illustrations as a result, for example, of manufacturing techniques and/or tolerances, are to be expected. Thus, aspects described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

"Group" means a group of the Periodic Table of the Elements according to the International Union of Pure and Applied Chemistry ("IUPAC") Group 1-18 group classification system.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid-state ion conductor comprising a compound of Formula (I):

$$Li_{4+(b-a)y+c\delta+(a-\gamma)x}M^1_{3+x+y}M^2_{3-y}M''_xO_{12}X^1_cX^2_{1-c}$$   Formula (I)

wherein, in Formula (I), $M^1$ is a cationic element having an oxidation state of a, wherein a is +3;

$M^2$ is a cationic element having an oxidation state of b, wherein b is +4;

M" is a cationic element having an oxidation state of γ, wherein γ is less $X^1$ is a cluster anion having an oxidation state of (−1−δ), wherein δ is 0 or $X^2$ is a halogen;

0<c≤1;

0≤x≤1; and

0≤y≤2.

2. The solid-state ion conductor of claim 1, wherein $M^1$ is Al, B, Ga, In, Sc, Y, Fe, Mn, Co, Ni, La, Ce, Pr, Nd, Sm, Eu, Gd, Dy, Ho, Er, Lu, or a combination thereof.

3. The solid-state ion conductor of claim 2, wherein $M^1$ is Al.

4. The solid-state ion conductor of claim 1, wherein $M^2$ is Si, Ti, Zr, Hf, Ge, Sn, or a combination thereof.

5. The solid-state ion conductor of claim 4, wherein $M^2$ is Si.

6. The solid-state ion conductor of claim 1, wherein x=0.

7. The solid-state ion conductor of claim 1, wherein 0<x≤1 and M" is Al, B, Ga, In, Sc, Y, Fe, Mn, Co, Ni, La, Ce, Pr, Nd, Sm, Eu, Gd, Dy, Ho, Er, Lu, Be, or a combination thereof.

8. The solid-state ion conductor of claim 1, wherein δ is 0 and the cluster anion $X^1$ has an oxidation state of −1.

9. The solid-state ion conductor of claim 8, wherein $X^1$ is $BH_4^-$, $BF_4^-$, $AlH_4^-$, $OH^-$, $SH^-$, $NH_2^-$ or a combination thereof.

10. The solid-state ion conductor of claim 1, wherein δ is 1 and the cluster anion $X^1$ has an oxidation state of −2 and $X^1$ comprises $S^{2-}$, $SO_4^{2-}$, or a combination thereof.

11. The solid-state ion conductor of claim 1, wherein c=1.

12. The solid-state ion conductor of claim 1, wherein 0<c<1 and $X^2$ is F, Cl, Br, I, or a combination thereof.

13. The solid-state ion conductor of claim 1, wherein $M^2$ is a cationic element having an oxidation state b of +4, and the solid-state ion conductor is of Formula (IA)

Formula (IA).

14. The solid-state ion conductor of claim 1, wherein
$M^1$ is Al;
$M^2$ is Si;
x is 0;
y is 1;
$X^1$ is $BH_4^-$, $BF_4^-$, $AlH_4^-$, $OH^-$, $SH^-$, $NH_2^-$, $S^{2-}$, $SO_4^{2-}$, or a combination thereof; and
c is 1.

15. A method of preparing a solid-state ion conductor, the method comprising:
contacting
a lithium compound;
a $M^1$ precursor;
a $M^2$ precursor;
an $X^1$ precursor;
optionally, a M" precursor; and
optionally a $X^2$ precursor
to provide a mixture; and
treating the mixture to provide the compound of Formula (I)

Formula (I)

wherein, in Formula (I),
$M^1$ is a cationic element having an oxidation state of a, wherein a is +3; than b;
$M^2$ is a cationic element having an oxidation state of b, wherein b is +4;
M" is a cationic element having an oxidation state of γ, wherein γ is less than b;
$X^1$ is a cluster anion having an oxidation state of (−1−δ), wherein δ is 0 or 1;
$X^2$ is a halogen;
0<c≤1;
0≤x≤1; and
0≤y≤2.

16. A positive electrode comprising:
a positive active material layer comprising a lithium transition metal oxide, a lithium transition metal phosphate, or a combination thereof; and
the solid-state ion conductor of claim 1 on the positive active material layer.

17. A negative electrode comprising:
a negative active material layer comprising lithium metal, a lithium metal alloy, or a combination thereof; and
the solid-state ion conductor of claim 1 on the negative active material layer.

18. A negative electrode for a lithium secondary battery, the electrode comprising:
a current collector; and
the solid-state ion conductor of claim 1 on the current collector.

19. An electrochemical cell comprising:
a positive electrode;
a negative electrode; and
an electrolyte layer between the positive electrode and the negative electrode;
wherein at least one of the positive electrode, the negative electrode, or the electrolyte layer comprises the solid-state ion conductor of claim 1.

* * * * *